A. H. POLLEN & H. ISHERWOOD.
APPARATUS FOR DETERMINING SIGHTING DATA FOR NAVAL GUNS.
APPLICATION FILED JULY 11, 1914.

1,232,968.

Patented July 10, 1917.

UNITED STATES PATENT OFFICE.

ARTHUR H. POLLEN, OF LONDON, AND HAROLD ISHERWOOD, OF YORK, ENGLAND.

APPARATUS FOR DETERMINING SIGHTING DATA FOR NAVAL GUNS.

1,232,968.      Specification of Letters Patent.      Patented July 10, 1917.

Application filed July 11, 1914. Serial No. 850,319.

*To all whom it may concern:*

Be it known that ARTHUR HUNGERFORD POLLEN and HAROLD ISHERWOOD, subjects of the King of Great Britain, residing at 14 Buckingham street, Strand, London, England, and Bishophill House, York, England, respectively, have invented certain new and useful Improvements in Apparatus for Determining Sighting Data for Naval Guns, of which the following is a specification.

This invention relates to apparatus for determining sighting data for naval guns.

The object is, primarily, to provide means whereby the range and bearing of a target as observed from a ship can be continuously indicated on suitable dials, although the observations of the target obtained at the range-finder may be intermittent observations.

We are aware that an apparatus has been in use for many years for indicating the instantaneous rate at which the range is altering. Such apparatus consists of a linkage one member of which represents the vector ship's course and speed, while a second member, pivoted at the extremity of the first vector, represents the vector target course and speed. The resultant vector represents relative target course and speed. In such apparatus, the projection of such resultant vector on the line of sight (which is always kept alined by the operator on the target) represents the instantaneous rate of change of range, and a projection on a line perpendicular to the line of sight represents the knots deflection to a certain scale.

In conjunction with the above apparatus it is usual to employ a clock driven mechanism of a variable speed type for indicating the range and whose speed can be manually varied in accordance with the indications of the rate of change of range obtained from the above apparatus so that the indicating mechanism continues to indicate the ranges resulting from such rates. We are also aware that suggestions have from time to time been made for eliminating the manual operation of the variable-speed mechanism therein by mechanically transferring the rate from the said apparatus to the said indicating mechanism. Moreover, a device for combining the functions of the two instruments in one machine has also heretofore been suggested.

According to the present invention we combine with the above mentioned range indicating mechanism, means for continuously indicating the bearing of the target.

Figure 1:
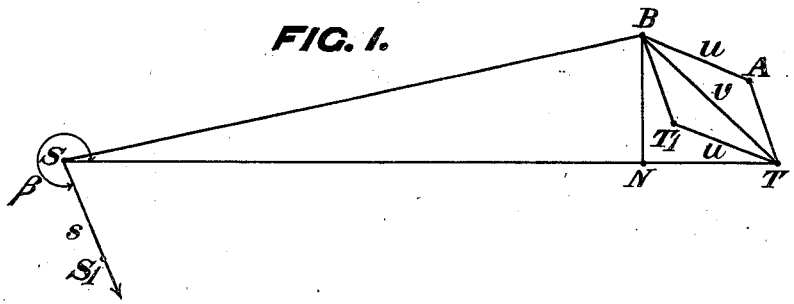
Figure 2:
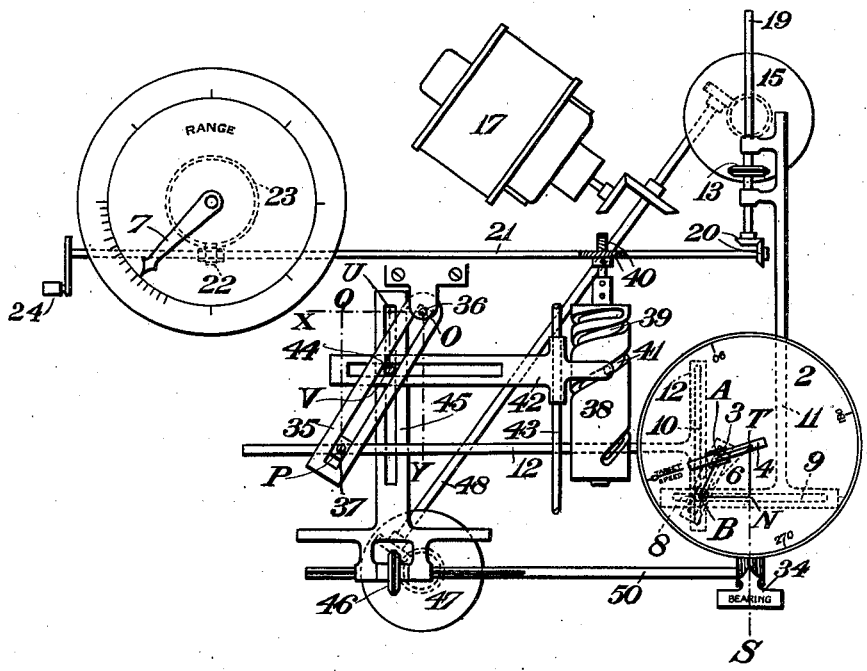

In order that the invention may be clearly understood, we proceed to describe the same with reference to the accompanying drawings in which, Figure 1 is a diagrammatic view illustrating the positions of the ship and target at the beginning and end of a short interval of time; and Fig. 2 shows diagrammatically, the principles employed in carrying out the invention.

Referring to Fig. 1: S represents the position of the ship and T that of the target at a certain instant of time. $S_1T_1$ which represents the positions after some unit interval of time. Then $SS_1 = s$ represents the course and speed of the ship, and $TT_1 = u$ which represents the course and speed of the target. We can reduce the ship to rest and find the new position of the target relative to the ship by supposing that the target has moved with a velocity compounded of its own velocity $u$ together with a reversed velocity $s$ equal to that of the ship. Draw TA equal and opposite to $SS_1$ and complete the parallelogram $ATT_1$ in the point B. Then B is the new position of the target relative to the ship supposed to be at rest.

The original range R is represented by ST, and the new range $R + dR$ is represented by SB. It will be noticed that in the particular instance shown the range is closing and therefore $dR$ is negative. The original bearing $\beta$ is the exterior angle $S_1ST$ and is represented by about 290°. The new bearing $\beta - d\beta$ is the angle $S_1SB$. It will be noticed that the bearing angle is getting smaller.

Now drop a perpendicular BN on the line ST.

When the unit time period is taken very small, the magnitudes SB and ST, are very great compared with the dimensions of the triangle TBN. Consequently, the change of range $dR$ in the interval is represented by TN.

In order, that this may be made quite clear it will be seen that the original range is ST. The range after unit time is SB, and the difference ST−SB is the change of range in unit time, or the rate of change of range. Again, when the time interval is small, ST−SB=TN. Therefore, TN represents the rate of change of range.

In the same way, the original bearing is $S_1ST$. The bearing after a unit interval of time is $S_1SB$. The difference BSN is the change of bearing in unit time, or the rate of change of bearing. Again, when the unit interval of time is small, $$BSN = \frac{BN}{R}$$

because when $\theta$ is small $\sin\theta = \theta$. In this instance, R indicates the range as before, it being remembered that the radius is the actual range. We have, therefore, the rate of change of range as represented by TN and the rate of change of bearings as represented by $$\frac{BN}{R}.$$

In other words, as $$\frac{BN}{SB} = \theta$$

when the angle is small and as S represents the position of the ship and B the target, the length SB equals range.

Referring now to Fig. 2, which shows diagrammatically the arrangements for carrying out the above objects, 2 is the bearing dial arranged on the top of the instrument and graduated in degrees of bearing which will read against a stationary pointer 34. It will be seen that the bearing indicated is about 290° which corresponds with the position of ship and target represented in Fig. 1. The bearing dial is centered at the point T and carries a radial guide 4. The radial guide 4 is, as shown arranged on the radius coinciding with the zero graduation of the bearing dial, and carries a sliding block 3 on which is mounted a vertical axis A.

The axis A carries a radial guide 6 in which can slide a member 8. The member 8 carries a pin B, the whole being arranged so that the pin B can be shifted radially in the said guide 6 which guide, in turn can be rotated around the axis A.

If Figs. 1 and 2 are compared, it will be seen that T in Fig. 2 represents the position of the target. The point S, representing the ship, lies somewhere outside the figure in the line joining T to the fixed bearing pointer 34. Always referring to Fig. 2 but comparing it at the same time with Fig. 1, it will be noted that the exterior angle STA represents the bearing $\beta$ and that the length TA represents the speed of the ship, so that by rotating the bearing dial 2 through the angle $\beta$ and sliding the block 3 in the guide 4 through a distance representing the ship's speed, we have displaced the axis A to a position corresponding to that shown in Fig. 1. Thus, TA is a vector representing the reversed ship's course and speed whose angular position is determined with regard to one fixed line ST. If the guide 6 is now rotated so as to be parallel to the target course and the block carrying the pin B is displaced along such ways by an amount representing the target speed, AB is then a vector representing target course and speed, and we shall have succeeded in so positioning the pin B that it corresponds to the position B in Fig. 1. TB is consequently the resultant of TA and AB, and is a vector which represents the relative course and speed of the target.

In Fig. 2, drop a perpendicular BN on the line ST passing through the fixed bearing pointer 34. Comparing again Fig. 1, the distance TN represents the rate of change of range $dR$, whereas the distance $$\frac{BN}{R}$$

represents the rate of change of bearing; that is, BN itself represents the rate of change of bearing multiplied by R or is equal to $Rd\beta$. In order to convert these lengths into actual motions of members of the machine, we provide a sliding member 11 adapted to slide parallel to the line ST and provided with a slot 9 arranged at right angles to the direction of sliding. The pin B is arranged to engage in such slot. Consequently, the displacement of the member 11 represents in magnitude and direction the rate of change of range $dR$. Similarly, a member 12 is arranged to slide in a direction perpendicular to the line ST and is provided with a slot 10 at right angles to its direction of sliding. The pin B likewise engages in this slot 10 so that the displacement of 12 is always equal to BN and, therefore, represents in magnitude and direction the quantity $Rd\beta$ and is R times the rate of change of bearing.

The sliding member 11 controls the disk 13 mounted so that it can slide but not rotate on the shaft 19. A disk 15, mounted about a center immediately beneath a point on the shaft 19, is driven at a constant speed by any suitable means which, in this instance are represented diagrammatically by the motor 17. The disk 15 is held upward in frictional contact with the disk 13 as is well understood. It follows from this construction that the speed of rotation of shaft 19 is proportional to the displacement of the disk 13 away from the center of the disk 15; that is, the shaft 19 rotates at a velocity representing the rate of change of range. The shaft 19 transmits its motion to the range hand 7 through mechanism indicated diagrammatically as bevel wheels 20, shaft 21 and skew gear 22, 23. The handle 24 when pushed inward disconnects shafts 21 and 19 and itself engages with the gear 22 so that the range hand can thereby be set to any desired range; but when the handle is released, the range hand acting under the influence of shafts 21 and 19, will be driven at such a speed that it will again operate to indicate the true range at future instants of time.

Referring again to Fig. 2, it will be remembered that the member 12 is given a displacement representing $Rd\beta$ by setting up the speed and course of the ship and the bearing, speed and course of the target.

In order to obtain therefrom a displacement proportional to $d\beta$, the change of bearing, we proceed as follows:—

We provide a swinging slotted arm 35 pivoted at 36. A pin 37 carried on the member 12 engages with the slot in arm 35. For convenience, we denote the center of the fixed pivot 36 by the letter O. Through O draw a line OX parallel to the direction of motion of member 12 and also a line OY perpendicular to this direction. When the member 12 is in its center position, i. e. when BN is zero, the pin 37 lies on line OY. We denote the center of the pin 37 by P and draw a line PQ perpendicular to OX. Then OQ will be equal to BN and, therefore, proportional to $Rd\beta$. We have mechanically to divide this quantity or displacement by R, which result we obtain by multiplying it by a quantity proportional to $$\frac{1}{R}.$$

We generate a displacement $$\frac{1}{R}$$

in the following way: 38 is a cylindrical cam whose axis is parallel to OY and whose groove 39 when developed is a rectangular hyperbola; this cam is rotated so that its position at any moment represents the range; the drive of the cam being effected from shaft 21 by means of skew gear 40. A roller 41 engages with this groove and is carried on the member 42 constrained to move parallel to OY as by sliding on the rod or bar 43. This member 42 is provided with a slot parallel to the direction OX. A pin 44 (whose center is denoted by V) is engaged in both the slot in member 35 and the slot in member 42. Draw a line VU perpendicular to OX. Then, since the position of the cam 39 is determined by R the range, and the developed cam surface is a rectangular hyperbola, the displacement VU will be proportional to $$\frac{1}{R}$$

and, consequently since OQ represents $Rd\beta$, OU will represent $$\frac{Rd\beta}{R}$$

or will represent $d\beta$ or the rate of change of range. We obtain the magnitude $d\beta$ as an actual displacement of a member 45 by constraining the member so as to move parallel to OX and providing it with a slot parallel to OY which also embraces the pin 44. The member 45 therefore by its displacement measures the quantity $d\beta$. We can therefore obtain a speed $d\beta$ for driving the bearing dial 2 by mounting a roller 46 of a frictional variable speed gear in the member 45. The disk 47 is driven at a constant speed, as by shaft 48 from the motor 17, and the shaft 50 on which the roller 46 is mounted will then rotate at a speed proportional to $d\beta$ and can, therefore, be geared to the bearing dial 2 in any suitable way. The results of these operations are as follows: As already explained, the shaft 21 rotates at the rate of change of range and, when the range hand 7 has been set to indicate the actual range, this hand will continue to indicate the correct range at future instants of time. Therefore, the total rotational displacement of the shaft 21 represents the range R. Hence, the displacement of the cam 38 represents the range R and, therefore, the displacement of the cam-actuated member 42 represents the quantity $$\frac{1}{R}.$$

The displacement $BN = Rd\beta$ and represents the product of the rate of change of bearing. This displacement is communicated to the member 12 so that displacement of this member represents $Rd\beta$.

The displacement of the member 11 represents the rate of change of range DR.

What we claim is:—

1. Apparatus for determining sighting data for naval guns including in combination, a rotatable dial graduated in degrees of bearing, a stationary pointer juxtaposed thereto, a range dial graduated in degrees of range, a range-hand movable thereover, a shiftable member displaceable with respect to the bearing dial, driving mechanism interposed between said shiftable member and the range hand for operating the hand, a rotatable cam-device actuatable by said driving mechanism, a slidable member positionable by said cam-device, a swinging element connected to said slidable member, an angular member operatively connected to said swinging and shiftable members and movable at right angles to the shiftable member, a roller-carrying member operatively connected to and positionable by said cam-actuated member and said swinging and angular members, and dial-operating mechanism interposed between the roller-carrying member and the bearing dial for operating said dial.

2. Apparatus for determining sighting data for naval guns including in combination, a rotatable dial graduated in degrees of bearing, a stationary pointer juxtaposed thereto, a range dial graduated in degrees of range, a range-hand movable thereover, a shiftable member displaceable with respect to the bearing dial, driving mechanism interposed between said shiftable member and the range hand for operating the hand, a rotatable cam-device actuatable by said driving mechanism, a slidable member positionable by said cam-device, a swinging element connected to said slidable member, an angular member operatively connected to said swinging and shiftable members and movable at right angles to the shiftable member, a roller-carrying member operatively connected to and positionable by said cam-actuated member and said swinging and angular members, dial-operating mechanism interposed between the roller-carrying member and the bearing dial for operating said dial, and a manually-actuated hand setting device connected to the range-hand.

3. Apparatus for determining sighting data for naval guns including in combination, a rotatable dial graduated in degrees of bearing, a stationary pointer juxtaposed thereto, a range dial graduated in degrees of range, a range-hand movable thereover, a shiftable member displaceable with respect to the bearing dial, driving mechanism interposed between said shiftable member and the range-hand for operating the hand, a rotatable cam-device actuatable by said driving mechanism, a slidable member positionable by said cam-device, a swinging element connected to said slidable member, an angular member operatively connected to said swinging and shiftable members and movable at right angles to the shiftable member, a roller-carrying member operatively connected to and positionable by said cam-actuated member and said swinging and angular members, dial-operating mechanism interposed between the roller-carrying member and the bearing dial for operating said dial, and a manually-actuated hand setting device connected to the range-hand and movable longitudinally to disconnect the driving mechanism from the range-hand.

4. Apparatus for determining sighting data for naval guns, a bearing dial graduated in degrees of bearing, a pointer juxtaposed to the dial, a range dial, a range-hand movable thereover, a shiftable member displaceable according to the rate of change of range, variable-speed integrating mechanism acting under the influence of the shiftable member and including a rotatable element whose total rotation represents range, a slidable member juxtaposed to the dials and representing the reciprocal of the range, cam-operated means driven by said speed mechanism to displace said slidable member, an angular member movable at an angle to the shiftable member, means acting under the influence of the shiftable member for displacing said slidable member so as to represent the reciprocal of the range, a roller-carrying member connected to the slidable member, a roller carried thereby, and means interacting with the slidable and angular members for multiplying the displacement of the angular member by the reciprocal of the range so obtained, thereby effecting displacement of the roller member representing rate of change of bearing.

5. Apparatus for determining sighting data for naval guns, comprising range-indicating means, a shiftable member displaceable according to the rate of change of range, a rotatable element angularly arranged to said member, a variable speed mechanism for integrating this so that the total rotation of said shaft represents range, a slidable member arranged parallel to the shaft, a roller-carrying member, cam-operated means for obtaining from such displacement representing range a displacement of the slidable member representing the reciprocal of the range, an angular member connected to the shiftable member, means for displacing the angular member so as to represent the product of range and rate of change of bearing, a roller positionable by said roller-carrying member, and means consisting of a link interacting with the angular and slidable members for multiplying such last displacement by the reciprocal of the range so obtained thereby producing the displacement of the roller representing rate of change of bearing.

6. Apparatus for obtaining sighting data for naval guns, comprising range-indicating means, a shiftable member displaceable according to the rate of change of range, a rotatable element controlled by said member, variable-speed mechanism for integrating this so that the total rotation of the rotatable element represents range, a slidable member acting under the influence of the rotatable element, cam-operated means for obtaining from such displacement representing range a displacement of the slidable member representing the reciprocal of the range, an angular member connected to the shiftable member, means for displacing the angular member so as to represent the rate of change of bearing, a roller-member, means consisting of a link-member interacting with the angular and slidable members for multiplying such last displacement by the reciprocal of the range so obtained thereby producing the displacement of the roller member representing rate of change of bearing, a bearing-representing member, a second variable speed mechanism operated by said roller-member and displaceable according to the rate of change of bearing and thereby obtaining a displacement of the member representing bearing, and a variable-speed mechanism for integrating the rate of change of bearing and indicating actual bearing.

7. Apparatus for determining sighting data for guns, a graduated bearing-dial, a pointer juxtaposed thereto, a range-dial, a range-hand movable thereover, a shiftable member displaceable according to the rate of change of range, an integrating mechanism acting under the influence of the shiftable member and including an element whose total movement represents range, a slidable member juxtaposed to the dials and representing the reciprocal of the range, means actuated by said integrating mechanism to displace the slidable member, a swinging member movable at an angle to the shiftable member, a roller-carrying member connected to the slidable member, and means interacting with the slidable member and said swinging member for multiplying the displacement of the associated member by the reciprocal of the range so obtained, thereby displacing the roller-carrying member representing the rate of change of bearing.

8. Apparatus for determining sighting data for guns, a graduated bearing-dial, a pointer juxtaposed thereto, a range-dial, a range-hand movable thereover, a shiftable member displaceable according to the rate of change of range, an integrating mechanism acting under the influence of the shiftable member and including an element whose total movement represents range, a slidable member juxtaposed to the dials and representing the reciprocal of the range, means actuated by said integrating mechanism to displace the slidable member, a swinging member movable at an angle to the shiftable member, means connected to said swinging member and displaceable according to the product of range and rate of change of bearing, and a roller-carrying member connected to the slidable member and displaceable according to the rate of change of bearing.

9. Apparatus for determining sighting data for guns, a graduated bearing-dial, a pointer juxtaposed thereto, a range-dial, a range-hand movable thereover, a shiftable member displaceable according to the rate of change of range, an integrating mechanism acting under the influence of the shiftable member and including an element whose total movement represents range, a slidable member juxtaposed to the dials and representing the reciprocal of the range, means actuated by said integrating mechanism to displace the slidable member and coacting with the shiftable member to determine the reciprocal of the range, a swinging member movable at an angle to the shiftable member, means for displacing the slidable member so as to represent the reciprocal of the range, and a roller-carrying device connected to the slidable member and displaceable according to the rate of change of bearing.

10. Apparatus for determining sighting data for guns, a graduated bearing-dial, a pointer juxtaposed thereto, a range-dial, a hand movable thereover, a shiftable member associated with the bearing-dial and displaceable according to the rate of change of range, integrating mechanism acting under the influence of the shiftable member and including a rotatable element whose total rotation represents range, a movable member juxtaposed to the dials and representing the reciprocal of the range, means actuated by said integrating mechanism to displace said movable member, an angular member movable at an angle to the shiftable member, means acting under the influence of the shiftable member for displacing said movable member so as to represent the reciprocal of the range, and means interacting with the slidable and angular members for multiplying the displacement of the angular member by the reciprocal of the range so obtained.

11. Apparatus for determining sighting data for guns, a graduated bearing-dial, a pointer juxtaposed thereto, a range-dial, a hand movable thereover, a shiftable member associated with the bearing-dial and displaceable according to the rate of change of range, integrating mechanism acting under the influence of the shiftable member and including a rotatable element whose total rotation represents range, a movable member juxtaposed to the dials and representing the reciprocal of the range, means actuated by said integrating mechanism to displace said movable member, an angular member movable at an angle to the shiftable member, means acting under the influence of the shiftable member for displacing said movable member so as to represent the reciprocal of the range, a roller-carrying member associated with the slidable member, and means interacting with the slidable and angular members for multiplying the displacement of the angular member by the reciprocal of the range so obtained, thereby effecting displacement of the roller member representing rate of change of bearing.

In testimony whereof we have hereunto set our hands in presence of two subscribing witnesses.

ARTHUR H. POLLEN.
HAROLD ISHERWOOD.

Witnesses of first signature:
M. C. O'HARA,
R. M. ORPEA.

Witnesses of second signature:
S. MATTHEWS,
C. B. CHICKEN.